Nov. 20, 1951    R. J. IRELAND    2,575,521
SPRAYING DEVICE
Filed June 21, 1948    2 SHEETS—SHEET 1
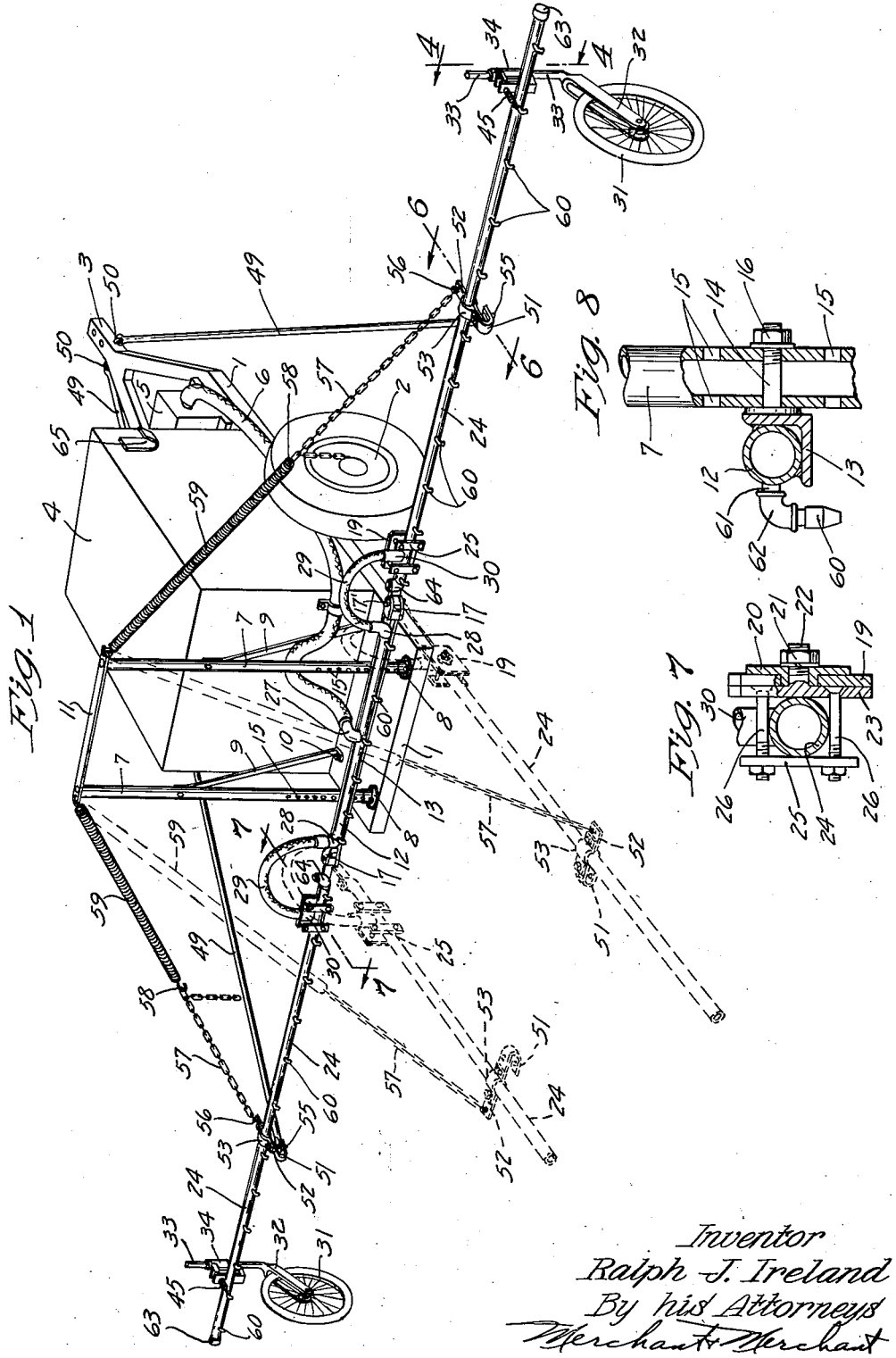
Inventor
Ralph J. Ireland
By his Attorneys
Merchant & Merchant

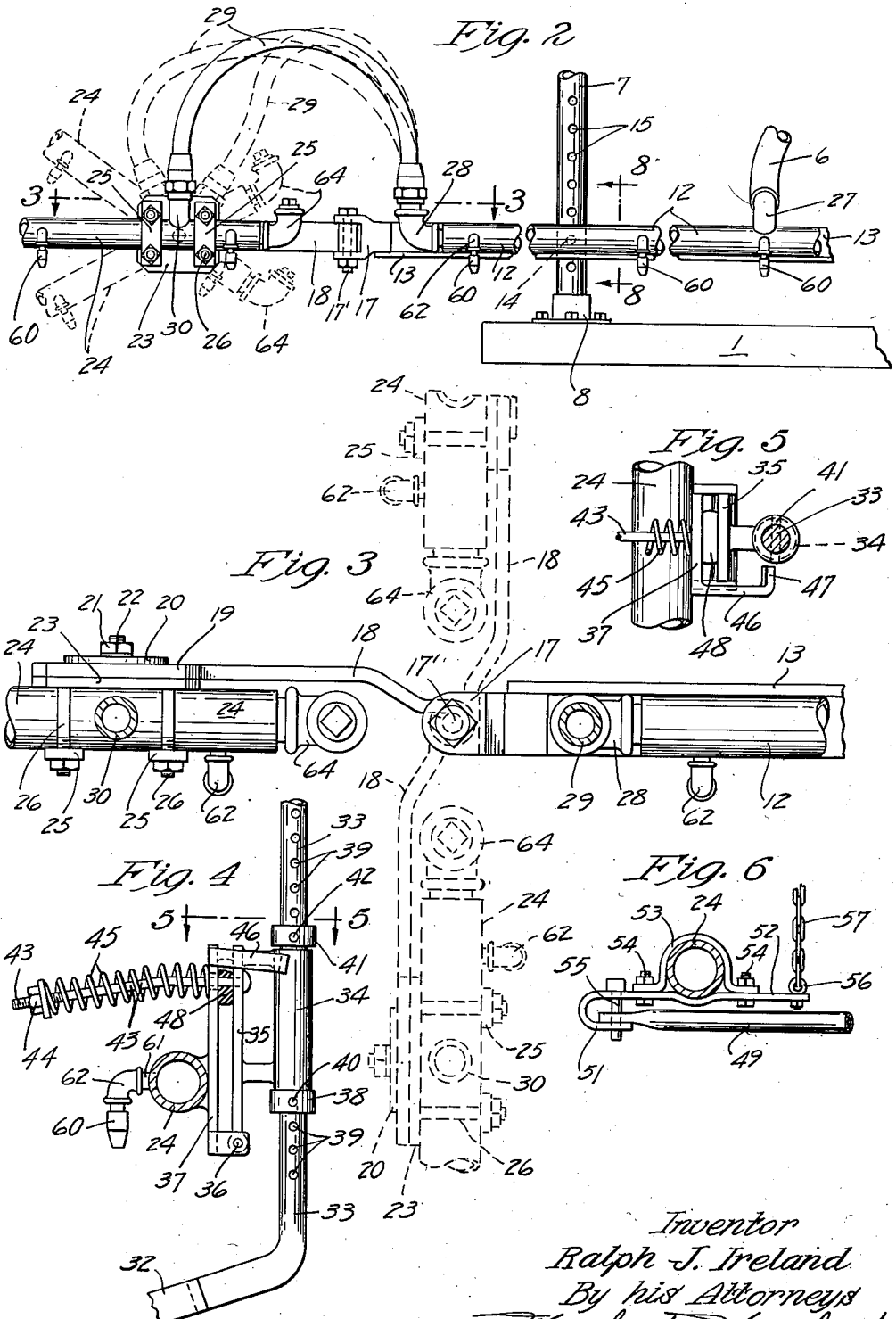

Patented Nov. 20, 1951

2,575,521

UNITED STATES PATENT OFFICE 2,575,521

SPRAYING DEVICE

Ralph J. Ireland, Mankato, Minn.

Application June 21, 1948, Serial No. 34,280

4 Claims. (Cl. 299—41)

My invention relates generally to sprayers and, more specifically, to spraying devices of the type which is adapted to be moved through a field for the purpose of spraying growing vegetation such as grain or the like.

A still further object of my invention is the provision of a spraying device as set forth which automatically follows variations in the terrain of a field so that the spray openings or nozzles will be maintained at a constant height from the ground.

Still another object of my invention is the provision of novel resilient supporting means for the sprayer booms of my device.

A still further object of my invention is the provision of a spraying device as set forth which is inexpensive to build, simple and rugged in construction, easily adjusted, and durable in use.

Other highly important objects and advantages will become apparent from the following specification, appended claims, and attached drawings Referring to the drawings, in which like characters indicate like parts throughout the several views:

Fig. 1 is a view in perspective of my novel spraying device as seen from the rear and one side;

Fig. 2 is an enlarged fragmentary view in rear elevation;

Fig. 3 is a still further enlarged fragmentary view, partly in section and partly in plan, taken on the line 3—3 of Fig. 2;

Fig. 4 is a view partly in section and partly in side elevation, taken substantially on the line 4—4 of Fig. 1, some parts being broken away;

Fig. 5 is a fragmentary detail, taken on the line 5—5 of Fig. 4;

Fig. 6 is an enlarged transverse section, taken on the line 6—6 of Fig. 1, some parts being broken away;

Fig. 7 is an enlarged transverse section, taken substantially on the line 7—7 of Fig. 1, some parts being broken away; and Fig. 8 is an enlarged fragmentary detail, taken substantially on the line 8—8 of Fig. 2.

Referring with greater detail to the drawings and particularly to Fig. 1, a platform-like frame is indicated by the numeral 1 and is supported by a pair of pneumatic tire-equipped wheels 2, one of which is shown. The frame 1 is provided at its front end with a tongue or drawbar 3 which is adapted to be secured to a tractor or other pulling apparatus not shown. Carried by the frame 1 is a tank 4 which is adapted to hold a supply of liquid to be sprayed and has conduit connections not shown to a fluid pressure pump also not shown but contained within a housing 5, which pump delivers the liquid under pressure to the spraying nozzles through a conduit 6.

A pair of laterally-spaced parallel supporting posts 7 extend vertically from the rear end of the frame 1 to which they are secured at their lower ends by flanged couplings 8. Braces 9 extend downwardly and forwardly from the intermediate portions of the supporting posts 7 and are secured to the frame, as indicated at 10. The upper ends of the supporting posts 7 are connected by a rigid bar 11 securely fastened thereto.

A tubular perforate sprayer manifold 12 extends transversely of the frame 1 and is welded or otherwise rigidly secured to a bar of structural angle iron or the like 13 to one side of which is welded a pair of spaced flanged studs 14. The studs 14 are adapted to pass through spaced apertures 15 on the supporting posts 7 and are secured fast by means of washer-equipped nuts or burrs 16 (see particularly Fig. 8). As will be seen by reference to Figs. 1, 2, and 8, the manifold 12 may be raised or lowered on the supporting posts 7 by simply removing the nuts 16 and inserting the studs 14 in any desired aperture 15.

At its opposite ends, the angle bar 13 is provided with bifurcated hinge members 17 to each of which is pivotally secured as at 17' a hinge element in the nature of an elongated bar 18 which, at its free end, terminates in a substantially rectangular pivot plate 19. Each of the pivot plates 19 is journalled on a flanged bushing 20 which is securely mounted by means of a lock washer-equipped nut 21 on a stud 22 projecting laterally outwardly from a flange or plate 23 (see Figs. 1, 2, 3, and 7). The stud 22 may be secured to the plate 23 by any suitable means but preferably, and as shown, is formed integrally therewith.

A pair of elongated perforate spraying manifolds in the nature of booms 24 have their inner end portions each clamped to one of the plates 23 by means of clamping bars 25 and nut-equipped clamping studs 26 which extend outwardly from the plates 23 through the bars 25. The booms 24 extend radially outwardly from the hinge members 17 and, as shown, normally lie in the same horizontal plane. However, the pivotal connection between the plates 19 and 23 enable the booms 24 to be swung about the axis of the stud 22 for a purpose which will hereinafter become apparent.

The conduit 6 is connected to the intermediate portion of the manifold 12 by means of an elbow 27; and the manifold 12, at its opposite ends, is provided with a pair of elbows 28. Flexible tubes 29 extend from the elbows 28 to connections 30 adjacent the inner ends of the booms 24, whereby to provide fluid conduit means between the manifold 12 and the booms 24.

Adjacent their outer ends, the booms 24 are supported by ground-engaging caster wheels 31 journalled in the outer open ends of forks 32 that are provided with normally vertically-extending spindles 33. Each of the spindles 33 is journalled for rotation and is longitudinally slidable in a sleeve 34 that is secured fast in spaced relation to a hinge plate 35 (see particularly Figs. 1, 4, and 5). The hinge plate 35 is pivotally mounted as indicated at 36 to a hinge plate 37 which, in turn, is secured by welding or the like to its respective boom 24. It will be seen, particularly by reference to Fig. 4, that the axes of the pivots 36 extend longitudinally of the booms 24. The hinge plates 35 and 37 extend at right angles to the booms 24 in a normally vertical plane. The sleeves 34 rest upon collars 38. The collars 38 are vertically adjustable on the spindle 33 by aligning the apertures therein with any one of the apertures 39 and inserting a pin or the like 40 through said aligned apertures. A second collar 41 embraces each spindle 33 at a point overlying its respective sleeve 34 and is held in place by a pin 42 projecting therethrough and one of the apertures 39, whereby to limit upward movement of the sleeve 34 relative to the spindle 33. It will be seen, by reference to Fig. 4, that the outer end portions of the booms 24 may be raised or lowered with respect to the ground by shifting the position of the collars 38 and 41 on the spindles 33.

The location of the caster wheels 31 with respect to the booms 24 and the weight of the booms thereon create a tendency for the hinge plates 35 and 37 to move pivotally away one from the other and tilt the spindles 33 away from the vertical plane. I provide resilient shock absorber means for maintaining the plates 35 and 37 in a substantially parallel relation and the spindle 33 in a substantially vertical position, said shock absorber means comprising elongated headed bolts 43 extending laterally one each through each pair of plates 35 and 37 adjacent their free ends, a washer-equipped nut 44 at the outer end portion of each bolt 43, and coil compression springs 45 interposed between the washer-equipped nuts 44 and the plates 37. The springs 45 normally maintain the spindles 33 in a vertical position when the machine travels over the ground, but will be compressed to a limited extent when the caster wheels 31 encounter obstructions such as stones or the like which may lie in the path of travel thereof. Movement of the hinge plates 35 and 37 away from each other and resultant movement of the spindle 33 away from the vertical plane is limited by a hook-like member 46 fast on the upper end of the hinge plate 37. The hook-like member 46 extends forwardly of the hinge plate 35 and terminates in an inturned hook or ear 47 which is adapted to engage the upper end portion of the hinge plate 35 upon swinging movements of the hinge plate 35 away from the hinge plate 37. A rubber-like buffer in the nature of a bushing 48 embraces the bolt 43 between the hinge plates 35 and 37 and forms a cushion between hinge plates 35 and 37. In their operative positions, the axes of the booms lie in a vertical plane extending through the axes of the manifold 12, as shown by full lines in Figs. 1 and 3. This position is maintained by a pair of tie rods or bars 49 which extend diagonally rearwardly and outwardly from the tongue or drawbar 3 to a point intermediate the ends of the booms 24. At their forward ends, the tie rods 49 are connected to the drawbar 3 by means of eye bolts 50; and, at their rear ends, the tie rods 49 are detachably secured to hooks or clevises 51 which form the rear ends of brackets 52 rigidly secured to the intermediate portion of their respective booms 24 by means of clamping straps 53 and nut-equipped bolts 54. The clevises 51 include the conventional clevis pins 55 which extend through apertures in the rear ends of the tie rods 49.

The brackets 52 extend forwardly of their respective booms 24 and are provided at their forward ends with anchoring eye bolts 56 to which are secured the outer ends of flexible link chains or the like 57 (see Figs. 1 and 6). Adjacent their other ends, the chains 57 are engaged by the hooked ends 58 of a pair of coil extension springs 59 that are anchored to the opposite ends of the cross bar 11 atop the supporting posts 7. The springs 59 may be hooked through any of the links of the chain 57, as desired, whereby to support a part of the weight of the booms 24 and caster wheels 31. I have found that best operating conditions of the machine are obtained when the springs 59 are connected to the chains 57 at a point which will cause the springs to support approximately two-thirds of the weight of the booms 24. It will be observed, by reference to Figs. 1 and 6, that suspension of the booms 24 from a point forwardly of the axes thereof will tend to twist the booms 24 in a counterclockwise direction with respect to Fig. 6. This arrangement balances or offsets the twisting action in the opposite direction set up by the weight of the booms 24 on the caster wheels 31 and the drag of the caster wheels 31 over the ground when the machine is moved forwardly through a field, whereby to neutralize twisting strain which would be transferred to the pivot on the stud 22, the hinge 17', and the hinge bar 18.

The tubular manifold 12 and the booms 24 may be perforated in any suitable manner for delivery of liquid therefrom to the vegetation to be treated, but, preferably and as shown, I provide a plurality of longitudinally-spaced downwardly-directed nozzles 60 connected thereto by means of pipe nipples 61 and elbows 62. The spray nozzles 60 are of conventional design and the details of construction thereof are not shown or described in detail. At their outer ends, the tubular booms 24 are closed by caps 63 and at their inner ends by plug-equipped elbows 64. A pair of upwardly-opening hanger brackets 65 (one of which is shown) are secured to either side of the supply tank 4. The booms 24 may be disconnected from their respective tie rods 49 by merely removing the clevis pins 55; and the booms 24 may then be swung upon the axes of the hinges 17' and pivot joints on the studs 22 upwardly and forwardly to a point where they can be supported in the hanger brackets 65 for transportation from one location to another. If desired, after disconnecting the tie rods 49 from the clevises 51, the booms 24 may be moved to a position indicated by dotted lines in Figs. 1 and 2 where they trail the wheel-mounted frame 1. In either of these inoperative positions, the structure is sufficiently narrow to easily pass through an opening such as a gate or the like. It will be understood, of course, that the tie rods 49, when disconnected from the clevises 51, may be raised and swung to a position where they also may be received in the hanger brackets 65.

In the event that, when the machine is travelling through a field to be sprayed, one of the caster wheels 31 encounters an obstruction such as a stone or the like, the shock is absorbed by the coil compression spring 45 of its respective caster wheel 31 and upward bias exerted on the boom 24 thereof by its cooperating spring 59 will cause the caster wheel 31 to easily ride over such obstruction. The compression spring 45 absorbs to a great extent any twisting shock which would otherwise be imparted to the boom 24 by the impact of the caster wheel 31 upon the obstruction. Inasmuch as only a portion of the entire weight of the booms 24 is supported by the flexible connections formed by the chains 57 and springs 59, the outer ends of either of the booms 24 will raise or lower according to the nature of the terrain over which the machine is moved. In other words, if the spraying device moves over ground which is very uneven, the caster wheels 31 will follow the exact contour of the ground and the booms 24 and spray nozzles 60 will be maintained at a relatively constant level above the ground. In some instances, it is desirable to spray vegetation in ditches along side of a roadway or upon embankments sloping upwardly from a roadway. In either of these conditions, the operator of the machine will effectively shorten or lengthen the chain 57 as the case may require so that when the boom 24 inclines or declines from the frame 1, its cooperating spring 59 will still be caused to support approximately two-thirds of its weight. Such inclination or declination is illustrated by dotted lines in Fig. 2. It is to be further noted, that, when the tubular manifold 12 is raised or lowered with respect to the frame 1, the outer end portions of the booms will be adjusted by manipulation of the collars 38 and 41 on the spindles 33 so that, when the machine is resting upon level ground, the booms 24 will also be level. Obviously, when the manifold 12 and booms 24 are raised, the chains 57 must be shortened to the point where the springs 59 will bear the required amount of load.

While I have illustrated a tubular boom, it should be obvious that the boom may take any desired form such as an angle iron or the like, in which event any suitable fluid conduit for carrying the fluid to be sprayed will be associated therewith.

My invention has been thoroughly tested and found to be entirely adequate for the accomplishment of the objects set forth; and, while I have shown and described a preferred embodiment of my spraying device, it will be understood that the same is capable of modification without departure from the scope and spirit of the invention as defined in the claims.

What I claim is:

1. In a device of the class described, a mobile frame, a tubular spraying boom secured to said frame for pivotal movements on horizontal and vertical axes, a caster wheel carried by said boom adjacent the free end thereof, detachable means associated with said frame for maintaining said boom in a desired operative position at an angle to said frame for movements only on said horizontal axis, and a flexible connection between the intermediate portion of said boom and said frame at a point above said pivotal connection, said flexible connection being resilient in part and exerting a yielding bias on said boom in an upward direction when said boom is in operative position, said flexible connection to said boom being radially offset from the axis of the boom in the direction of normal movement whereby said flexible resilient connection will exert both a yielding bias on said boom in an upward direction when said boom is in an operative position and a twisting action on said boom, the connection between said caster wheel and said boom including a fork-equipped spindle in advance of said boom, an abutment collar vertically adjustably mounted on said spindle, a sleeve in advance of said boom longitudinally slidably mounted on said spindle and adapted to be supported by said collar, hinge means connecting said sleeve to said boom, and yielding means on said hinge means biasing said caster wheel in the direction of movement.

2. In a device of the class described, a mobile frame, a tubular spraying boom secured to said frame for pivotal movements on horizontal and vertical axes, a caster wheel carried by said boom adjacent the free end thereof, detachable means associated with said frame for maintaining said boom in a desired operative position at an angle to said frame for movements only on said horizontal axis, and a flexible connection between the intermediate portion of said boom and said frame at a point above said pivotal connection, the connection of said caster wheel to said boom including a fork-equipped spindle, an abutment collar vertically adjustably mounted on said spindle, a sleeve longitudinally slidably mounted on said spindle and adapted to be supported by said collar, hinge means connecting said sleeve to said boom, yielding means on said hinge means biasing said wheel toward the direction of movement, and means limiting movement of said hinge against bias of said spring.

3. In a device of the class described, a mobile frame, a tubular spraying boom secured to said frame for pivotal movements on horizontal and vertical axes, means for maintaining said boom in a desired operative position at substantially right angles to the direction of movement for pivotal movements only on said horizontal axis, a flexible connection between the intermediate portion of said boom and said frame at a point above said pivotal connection, a caster wheel carried by said boom adjacent the free end thereof, the connection between said caster wheel and said boom including a generally vertically disposed spindle, hinge means between said spindle and said boom permitting limited rocking movements of said spindle and wheel on a horizontal axis, and yielding means biasing said spindle and wheel in a forward direction.

4. The structure defined in claim 3 in further combination with means for vertically adjusting the head of the free end of said boom with respect to said caster wheel.

RALPH J. IRELAND.

REFERENCES CITED

The following references are of record in the file of this patent:

UNITED STATES PATENTS

| Number | Name | Date |
|---|---|---|
| 1,633,294 | Stubenberg | June 21, 1927 |
| 1,943,655 | Cummings | Jan. 16, 1934 |
| 2,169,948 | Gallupe | Aug. 15, 1939 |
| 2,297,110 | Parker | Sept. 29, 1942 |

FOREIGN PATENTS

| Number | Country | Date |
|---|---|---|
| 37,954 | Denmark | Sept. 7, 1927 |
| 49,631 | Netherlands | Oct. 16, 1940 |
| 443,618 | Great Britain | Mar. 3, 1936 |